US006588782B2

(12) United States Patent
Coomber et al.

(10) Patent No.: US 6,588,782 B2
(45) Date of Patent: Jul. 8, 2003

(54) RUNNING BOARDS AND METHODS OF CONSTRUCTING A RUNNING BOARD

(75) Inventors: Terry Coomber, Dundas (CA); Brian M. Riede, Newnan, GA (US); Larry Newman, Newnan, GA (US)

(73) Assignees: R. W. Coomber 1998, Inc., Mississauga (CA); William L. Bonnell Co., Inc., Newnan, GA (US)

( * ) Notice: Subject to any disclaimer, the term of this patent is extended or adjusted under 35 U.S.C. 154(b) by 0 days.

(21) Appl. No.: 10/058,935

(22) Filed: Jan. 30, 2002

(65) Prior Publication Data

US 2003/0011163 A1 Jan. 16, 2003

Related U.S. Application Data

(60) Provisional application No. 60/304,779, filed on Jul. 13, 2001.

(51) Int. Cl.⁷ .................................................. B60R 3/00
(52) U.S. Cl. ..................... 280/163; 280/169; 280/762
(58) Field of Search ..................... 280/163, 164.1, 280/164.2, 166, 169, 762, 770; 293/117

(56) References Cited

U.S. PATENT DOCUMENTS

| | | | | |
|---|---|---|---|---|
| 2,084,014 A | * | 6/1937 | Bronson | 280/169 |
| 2,084,019 A | * | 6/1937 | Edwards | 280/163 |
| 2,140,887 A | * | 12/1938 | Tinnerman | 52/718.06 |
| 3,774,952 A | * | 11/1973 | Zorn | 293/117 |
| 4,011,695 A | * | 3/1977 | Simmons, Sr. | 52/8 |
| 4,257,620 A | * | 3/1981 | Okland | 280/848 |
| 4,463,962 A | * | 8/1984 | Snyder | 280/164.1 |
| 4,716,988 A | | 1/1988 | Graffy | 182/228.5 |
| 5,193,829 A | * | 3/1993 | Holloway et al. | 280/163 |
| 5,382,035 A | * | 1/1995 | Waddington et al. | 280/169 |
| 5,713,589 A | | 2/1998 | Delgado et al. | 280/163 |
| 5,829,774 A | * | 11/1998 | Klemp | 280/507 |
| D411,976 S | | 7/1999 | McCauley | D12/203 |
| 6,050,579 A | | 4/2000 | Selland et al. | 280/163 |
| D424,006 S | | 5/2000 | Lemieux et al. | D12/203 |
| 6,173,979 B1 | | 1/2001 | Bernard | 280/163 |
| 6,203,040 B1 | | 3/2001 | Hutchins | 280/169 |
| 6,244,734 B1 | | 6/2001 | Hulse | 362/495 |
| 6,409,193 B2 | * | 6/2002 | Bernard | 280/163 |

* cited by examiner

Primary Examiner—Brian L. Johnson
Assistant Examiner—Bridget Avery
(74) Attorney, Agent, or Firm—Hunton & Williams

(57) ABSTRACT

A running board assembly for attachment to a vehicle is provided. The running board assembly includes a running board and a mounting bracket, for mounting the running board. The running board includes an elongated support portion including a support wall portion, which has an inward wall portion and an outward wall portion. An outward shoulder portion is disposed on the outward wall portion. An inward shoulder portion is disposed on the inward wall portion. Multiple cap portions are connected to the outward shoulder portion and the inward shoulder portion of the support portion. The cap portions are spaced from each other along the support portion to define step pad receiving openings. A step pad is connected to the outward shoulder portion and the inward shoulder portion of the support portion. The step pad is disposed in the step pad receiving opening.

29 Claims, 12 Drawing Sheets

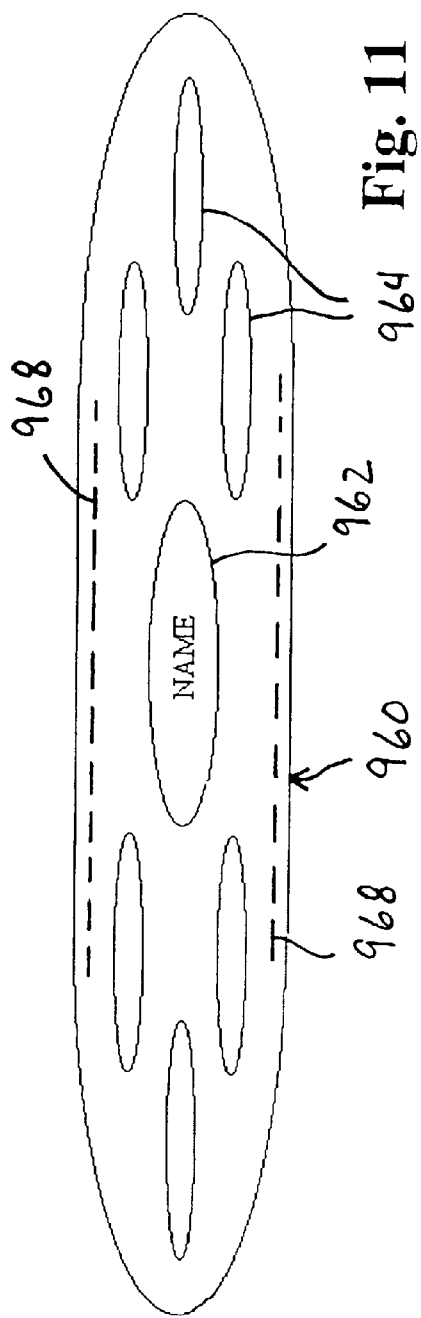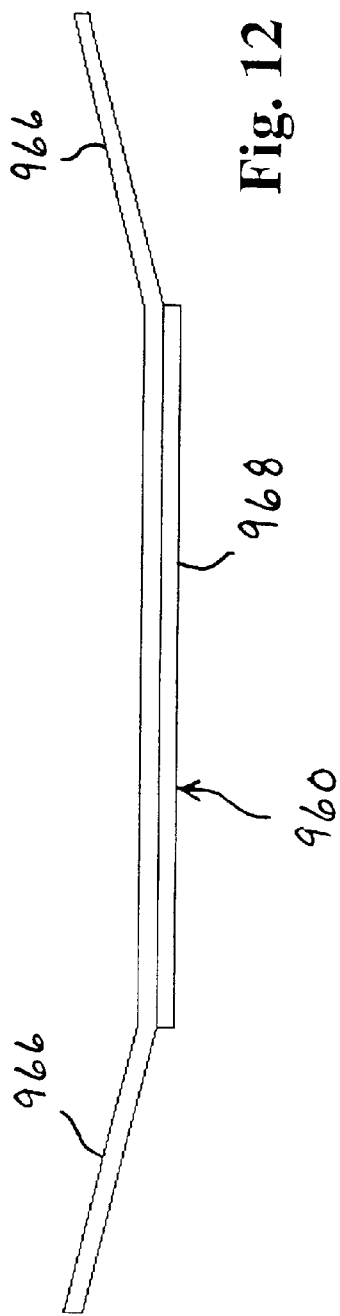

RUNNING BOARDS AND METHODS OF CONSTRUCTING A RUNNING BOARD

CROSS-REFERENCE TO PRIOR APPLICATIONS

This application claims priority to provisional application Ser. No. 60/304,779 filed on Jul. 13, 2001. The contents of the provisional application are incorporated herein by reference in its entirety.

FIELD OF THE INVENTION

The invention relates to construction of running boards and methods of making running boards for vehicles.

BACKGROUND OF THE INVENTION

It should be appreciated that running boards are commonly disposed on vehicles for a variety of reasons. For example, the running boards might be disposed on a vehicle to assist a user of the vehicle to climb into the vehicle. Further, running boards might be placed on a vehicle for aesthetic reasons or to protect the side of the vehicle, for example.

Using known techniques, running boards have typically been constructed using steel or another suitable metal. For example, running boards constructed of steel are often constructed by bending the steel. Further, a common steel running board is generally formed into a particular shape for a particular vehicle. However, there are various disadvantages of this approach to making running boards. One disadvantage is that the steel running board, which is made for a particular vehicle, is not adaptable to a different vehicle subsequent to manufacture of the running board. This results in the necessity to uniquely manufacture separate running boards for each separate vehicle. Further, this manufacture of running boards is time consuming and difficult. There are various other disadvantages with known techniques for constructing running boards.

BRIEF SUMMARY OF THE INVENTION

The various embodiments of the invention provide a running board, as well as a method of constructing and using a running board, which overcomes various disadvantages of known running boards.

A running board assembly for attachment to a vehicle, in accordance with one embodiment of the invention, includes a running board and a mounting bracket. The running board includes an elongated support portion. The support portion includes a support wall portion having an inward wall portion and an outward wall portion. The support portion further includes an outward shoulder portion and an inward shoulder portion. The outward shoulder portion is disposed on the outward wall portion. The inward shoulder portion is on the inward wall portion. Further, the running board assembly includes at least two cap portions, each of the at least two cap portions is connected to the outward shoulder portion and the inward shoulder portion. The at least two cap portions are spaced from each other along the support portion. As a result, an opening for a step pad is defined by the spaced apart cap portions. Also, the running board assembly includes the step pad. The step pad is connected to the outward shoulder portion and the inward shoulder portion of the support portion. The step pad is disposed in the step pad receiving opening between the cap portions. In accordance with one embodiment of the invention, a running board is constructed of aluminum. However, as should be appreciated, other materials may be used as desired.

BRIEF DESCRIPTION OF THE DRAWINGS

The present invention can be more fully understood by reading the following detailed description of the presently preferred embodiments together with the accompanying drawings, in which like reference indicators are used to designate like elements, and in which:

FIG. 11 is a top plan view of a cap portion in accordance with one embodiment of the invention;

FIG. 12 is a side elevation view showing the cap portion of FIG. 11 in accordance with one embodiment of the invention;

DETAILED DESCRIPTION OF THE INVENTION

Further details of the systems and methods of the invention will hereinafter be described. As used herein, any term in the singular may be interpreted to be in the plural, and alternatively, any term in the plural may be interpreted to be in the singular.

The foregoing description of various products, methods, or apparatus and their attendant disadvantages as set forth in the "Background of the Invention" is in no way intended to limit the scope of the invention, or to imply that the invention does not include some or all of the various elements of the products, methods, and/or apparatus in one form or another. Indeed, various embodiments of the invention may be capable of overcoming some of the disadvantages noted therein, while still retaining some or all of the various elements of the products, methods, and apparatus in one form or another.

Figure 1:
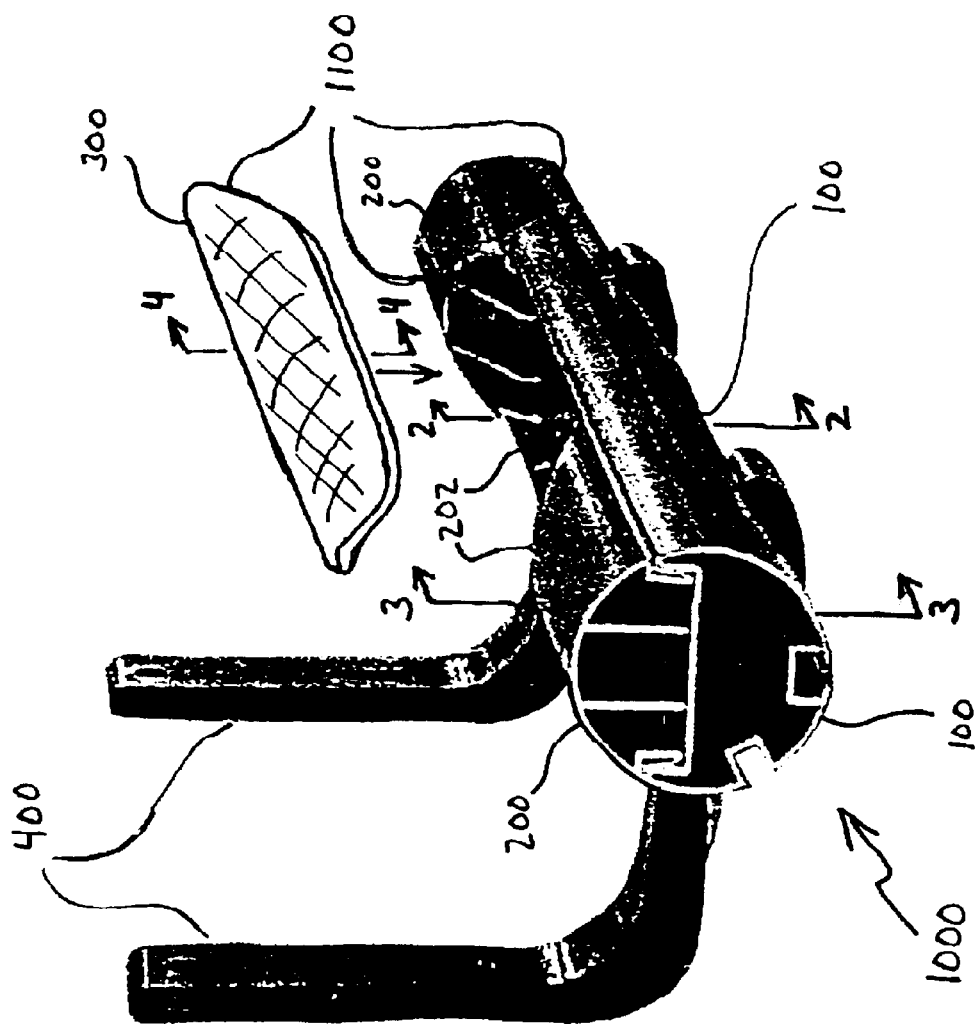
FIG. 1 is a perspective view showing features of a running board attached to mounting brackets in accordance with one embodiment of the invention.

The present invention provides a running board, including a method of making and using the running board. FIG. 1 is a diagram showing features of a running board assembly 1000. The running board assembly 1000 includes a running board 1100 and a mounting bracket 400. Specifically, the running board 1100 is attached to the mounting bracket 400 in such a manner so as to attach the running board 1100 to a vehicle, as may be desired.

With further reference to FIG. 1, the features of a running board in accordance with one embodiment of the invention include a support portion 100 and a plurality of cap portions 200. The cap portions 200 are attached to the upper portion of the support portion 100, as is described in further detail below. The cap portions 200 and the support portion 100 may be formed into the shape of a tube as shown in FIG. 1, for example. However, any of a variety of shapes may be used as is desired, such as any tube, elliptical, oval, or tear drop shape, for example.

Figure 6:
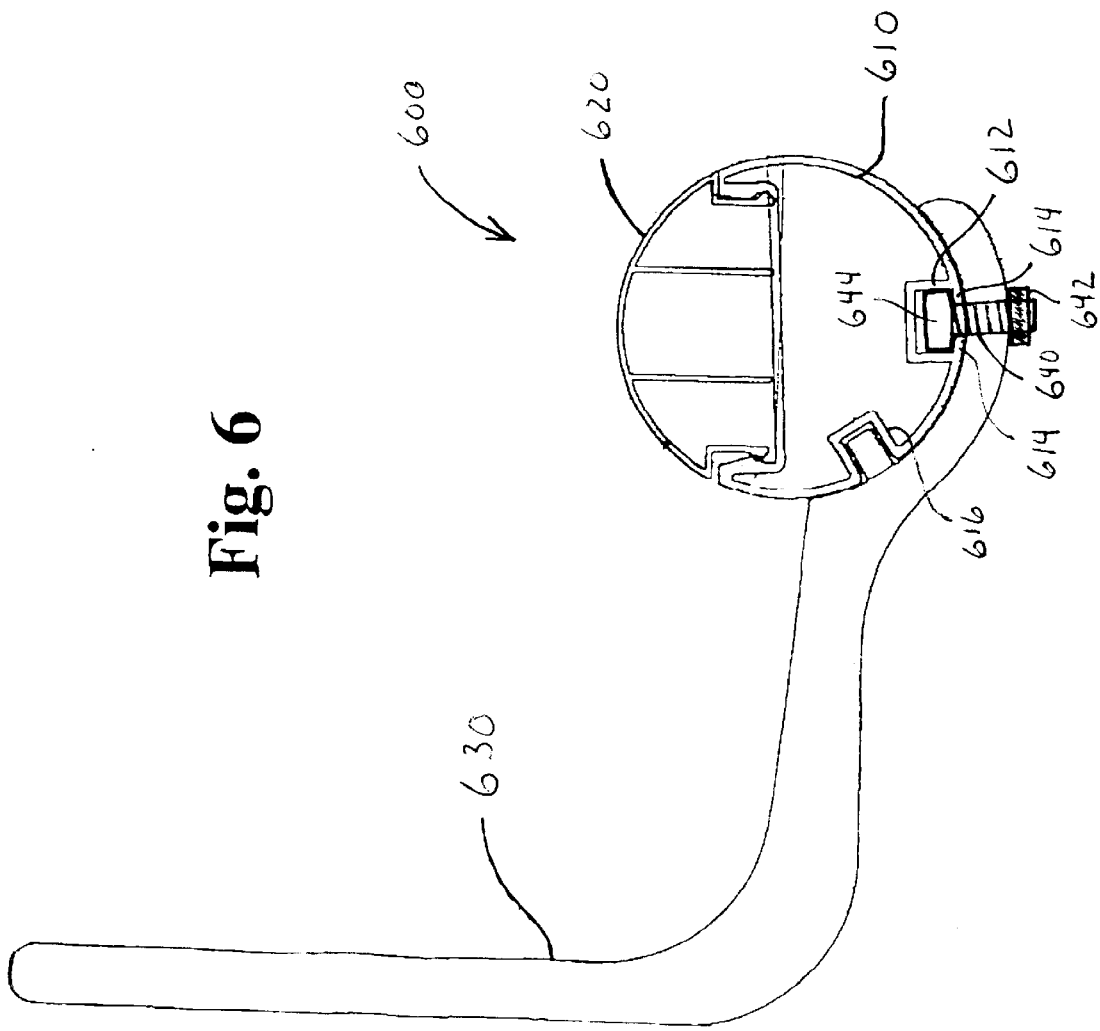
FIG. 6 is an end elevation view showing features of a structure of a running board attached to a mounting bracket in accordance with one embodiment of the invention.

The cap portions 200 of the running board of the invention are disposed on the support portion 100 in a spaced apart manner as shown in FIG. 1. In accordance with one embodiment of the invention as described below, FIG. 6 is a diagram showing the attachment of one cap portion 200 to the support portion 100. The attachment of the cap portion 200 the support portion 100 may be effected by using an attachment technique or techniques, as are described in further detail below.

The arrangement of a number of the cap portions 200 along a support portion 100 provides for the attachment of a step pad 300, as shown in FIG. 1. The step pad 300 is disposed between two of the cap portions 200 and disposed on a segment of, and connected to, the support portion 100. The step pad 300 may be secured to the support portion 100 by using a variety of attachment techniques. Illustratively, the step pad 300 may include a fastener device that extends from an inner surface of the step pad 300. Further, the step pad 300 may be constructed of any of a variety of materials such as plastic or metal, for example.

FIG. 1 also shows the attachment of the mounting bracket 400 to the support portion 100. For example, a portion or portions of the mounting bracket 400 may be received within a recess (or recesses) of the support portion 100, as described below and shown in FIGS. 8 and 9. One or more mounting brackets 400 may be used to support the support portion 100. The mounting brackets 400 that are used to support the running board 1100 may have a variety of shapes dependent upon the particular vehicle upon which the running board assembly is to be mounted, as well as desired position of the running board assembly 1000 upon a vehicle, for example.

Figure 2:
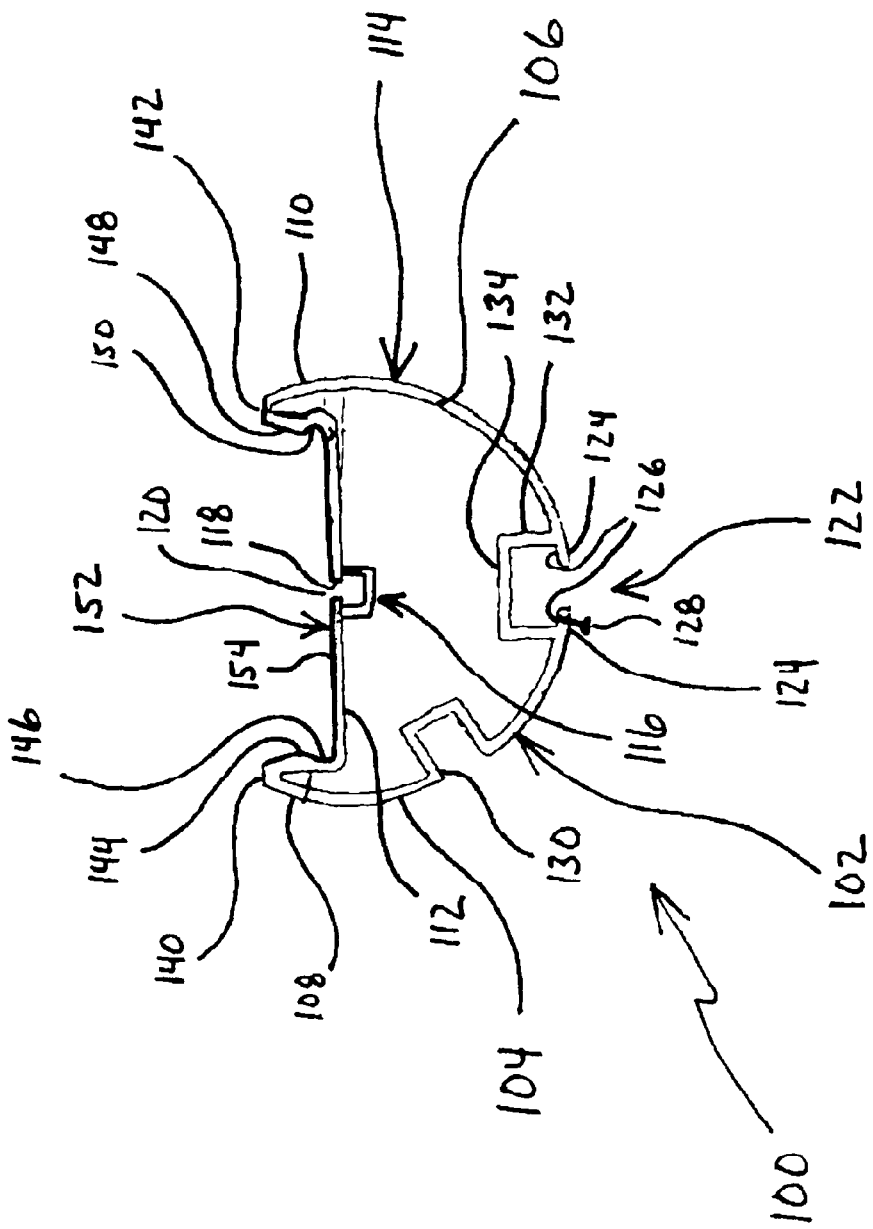
FIG. 2 is a cross-sectional diagram of the support portion taken along line 2—2 of FIG. 1 in accordance with one embodiment of the invention.

FIG. 2 is a cross sectional diagram showing further details of the support portion 100. As shown in FIG. 2, the support portion 100 includes a support wall portion 102. The support wall portion 102 includes an inward wall portion 104 and an outward wall portion 106. In accordance with one embodiment of the invention, the outward wall portion 106 and the inward wall portion 104 together form what might be characterized as the shape of a trough. Further, it should be appreciated that the inward wall portion 104 and the outward wall portion 106 may be integrally formed and include additional portions for purposes of connection of the mounting bracket 400, as described in further detail below.

The support portion 100 further includes an inward shoulder portion 108 and an outward shoulder portion 110. The inward shoulder portion 108 is disposed on the inward wall portion 104. Further, the inward shoulder portion 108 may be integrally formed with the inward wall portion 104.

In a similar manner to the inward shoulder portion 108, the outward shoulder portion 110 is disposed on the outward wall portion 106. The outward shoulder portion 110 may be integrally formed with the outward wall portion 106.

The support portion 100 further includes a connecting wall 112. The connecting wall 112 extends between the inward shoulder portion 108 and the outward shoulder portion 110. Further, the connecting wall 112 may be integrally formed with either or both the inward shoulder portion 108 and the outward shoulder portion 110. The connecting wall 112, the inward shoulder portion 108, the outward shoulder portion 110 and the wall portions (104, 106) may be characterized as forming a substantially annular member 114. In accordance with one embodiment of the invention, the annular member 114 may be formed by a suitable extrusion process. Alternatively, the annular member 114 may be formed by a suitable molding process, for example.

As shown in FIG. 2 and in accordance with one embodiment of the invention, the support portion 100 includes a keeper portion 116. More particularly, the keeper portion 116 of the support portion 100 is disposed on and forms a part of the connecting wall 112. The keeper portion 116 includes a keeper slot 118. The keeper portion 116 assists in retaining the step pad 300, as shown in FIG. 1, upon the support portion 100 in accordance with one embodiment of the invention.

As described in further detail below and shown in FIG. 4, the step pad 300 includes a fastener portion 302. The fastener portion 302 includes a fastener rod 304 and a fastener end 306. The fastener end 306 is disposed at an end of the fastener rod 304. The fastener rod 304 extends from a step pad member 308. In accordance with one embodiment of the invention, the step pad member 308 is punched and the fastener rod 304 is extended through the step pad member 308.

As shown in FIG. 2, the keeper slot 118 may be formed with an inlet 120, which forms a reduced opening into the keeper slot. The inlet 120 is engageable with the fastener end 306 to maintain the step pad 300 in a stable position upon the support portion 100. However, it should of course be appreciated that the invention is not limited to the attachment arrangement including the keeper portion 116 and the fastener portion 302. Rather, any of a variety of fastening arrangements may be utilized to maintain the step pad 300 upon the support portion 100 in a stable position. Also, further aspects of attachment of the step pad 300 upon the support portion 100 are described below.

The support portion 100, as shown in FIG. 2, is provided for attachment to the mounting bracket 400 as is described above. In accordance with one embodiment, the support portion 100 includes a lower slot portion 122. The lower slot portion 122 is disposed between the inward wall portion 104 and the outward wall portion 106. The lower slot portion 122 includes and is defined by opposing slot side walls 132 and a slot end wall 134.

The lower slot portion 122 may be integrally formed with the inward wall portion 104 and the outward wall 106 so as to form respective portions of the inward wall portion 104 and the outward wall portion 106. The lower slot portion 122 is engageable with an attachment shoulder 402 of the mounting bracket 400. To explain further, the lower slot portion (or "lower slot") 122 includes opposing flanges 124 as shown in FIG. 2. The interior surface of each corresponding flange 124 forms a flange retaining surface 126. The lower slot 122 runs along the length of the support portion 100, so as to be conducive towards utilizing an extrusion process to construct the support portion 100, in accordance with one embodiment of the invention.

Figure 5:
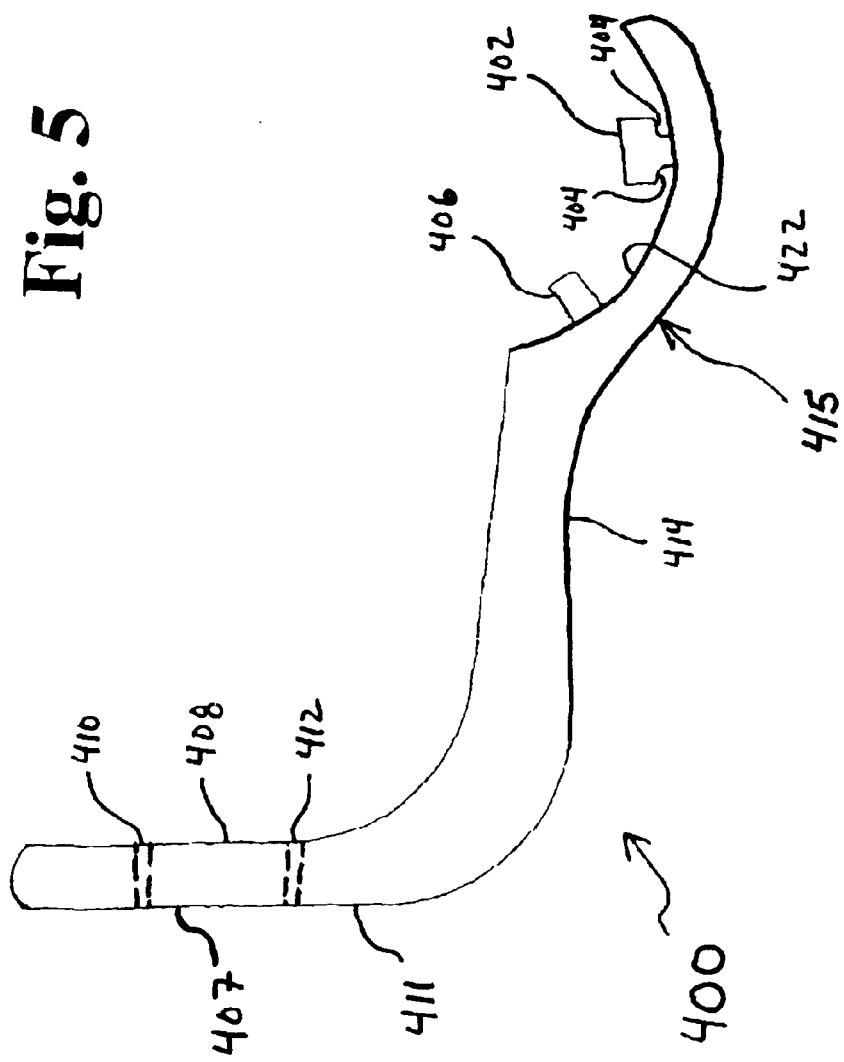
FIG. 5 is a side elevation view of a mounting bracket of FIG. 1 in accordance with one embodiment of the invention.

As shown in FIG. 5, the mounting bracket 400 includes an attachment shoulder 402. The attachment shoulder 402 includes a shoulder retaining surface 404 in accordance with one embodiment of the invention. The attachment shoulder 402 is slidably received in the lower slot portion 122, i.e., slidable along the length of the support portion 100. To explain further, the exterior cross section of the attachment shoulder 402 corresponds to and is slightly smaller than the interior cross section of the lower slot portion 122. Accordingly, the shoulder retaining surface 404 contacts with the flange retaining surface 126 so as to limit relative movement between the mounting bracket 400 and the support portion 100, i.e., to limit such relative movement to slidable movement along the length of the support portion 100.

Once the mounting bracket 400 is disposed at a desired position along the length of the support portion 100, the attachment shoulder 402 is securably fastened into the lower slot portion 122 so as to preclude relative movement between the support portion 100 and the mounting bracket 400.

Any of a variety of techniques may be utilized to secure the support portion 100 to the mounting bracket 400. In accordance with one embodiment as shown in FIG. 2, a securing screw 128 may be utilized. The securing screw 128 extends through one or both flanges 124 in a threadable manner, for example. The securing screw 128 is tightened upon the shoulder retaining surface 404 so as to preclude relative movement between the support portion 100 and the mounting bracket 400. However, it should of course be appreciated that any of a variety of securing techniques may be utilized in lieu of the securing screw 128. For example, the flange 124 might be spot-welded to the shoulder retaining surface 404 rather than using a securing device, such as the securing screw 128.

Accordingly, the support portion 100 may be secured to the mounting bracket 400 utilizing the lower slot portion 122 and the attachment shoulder 402. This attachment arrangement may be sufficient to secure the support portion 100 upon the mounting bracket 400. However, in some situations, it may be desirable to provide additional stability to the attachment of the support portion 100 upon the mounting bracket 400. Accordingly, the support portion 100 may also include a side slot 130.

The side slot 130 is disposed upon and forms a part of the inward wall portion 104 in accordance with one embodiment of the invention. The side slot 130 runs along the length of the elongated support portion 100, so as to be conducive towards construction utilizing an extrusion process to construct the support portion 100, in accordance with one embodiment of the invention. Illustratively, the side slot 130 may be disposed on the side of the support portion 100 that is adjacent to the vehicle, as opposed to disposing the side slot 130 on the outward side. This arrangement may be desired for aesthetic reasons.

As shown in FIG. 5, the mounting bracket 400 may include a stabilizer rib 406. The stabilizer rib 406 may be positioned in the side slot 130 so as to stabilize the support portion 100. The stabilizer rib 406 may be slidably moved in the side slot 130 along the length of the support portion 100 so as to afford the sliding movement necessary to attach the lower slot portion 122 to the attachment shoulder 402.

In a manner similar to the attachment using the lower slot portion 122, the interior dimensions of the side slot 130 correspond to and are slightly larger than the stabilizer rib 406 so as to allow the stabilizer rib 406 to be fitted in the side slot 130. While FIG. 2 and FIG. 5 show a particular geometrical shape for the side slot 130 and the stabilizer rib 406, respectively, it should be appreciated that any of a variety of shapes may be utilized to provide increased stability to the support portion 100.

As described above, the support portion 100 includes an inward shoulder portion 108 and an outward shoulder portion 110. The inward shoulder portion 108 includes a supporting shoulder 140. The supporting shoulder 140 provides a surface upon which either a cap portion 200 or a step pad 300 may be positioned. In a similar manner, the outward shoulder portion 110 includes a supporting shoulder 142. Accordingly, the supporting shoulder 140 and the supporting shoulder 142 provide for stable support of either a cap portion 200 or a step pad 300, both of which are disposed along the length of the support portion 100 in a spaced apart relationship.

The inward shoulder portion 108 also includes a retaining shoulder 144 and a retaining groove 146. The retaining shoulder 144 in conjunction with the retaining groove 146 serve to secure a cap portion 200, as well as a step pad 300, upon the support portion 100. In a similar manner, the outward shoulder portion 110 includes a retaining shoulder 148 and a retaining groove 150.

The supporting shoulder 140, the supporting shoulder 142, and the connecting wall 112 may be characterized as forming a channel 152. The channel 152 is constructed so as to slidably receive either a cap portion 200 or a step pad 300. Accordingly, an upper surface 154 of the connecting wall 112 extends between the inward shoulder portion 108 and the outward shoulder portion 110.

As described above, the channel 152 in the support portion 100 is constructed so as to slidably receive either a cap portion 200 or a step pad 300 at any point along the length of the support portion 100. As a result, it should be appreciated that such arrangement provides substantial variability in construction of the running board 1100. That is, the same support portion 100, cap portion 200 (which can be cut into multiple cap portions) and one or more step pads 300 may be utilized on a wide variety of vehicles. That is, the support portion 100 can be cut to a desired size. Further one or more cap portions 200 can also be cut to a desired size. Then, the sized cap portions 200 may be disposed on the sized support portion 100 and spaced as desired. The spacing of the cap portions 200 defines an opening for a step pad 300. As a result, the step pad 300 may be placed into the opening resulting in a "made to fit" running board, in accordance with embodiments of the invention.

Figure 3:
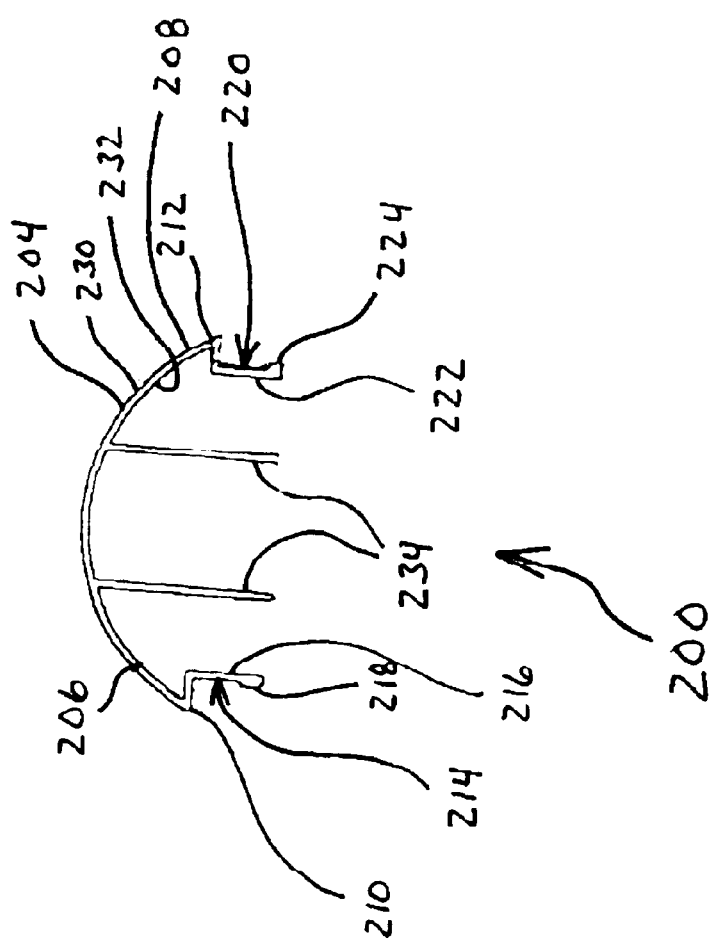
FIG. 3 is a cross-sectional view of the cap portion taken along line 3—3 of FIG. 1 in accordance with one embodiment of the invention.

FIG. 3 is a diagram showing further details of the cap portion 200. Typically, a plurality of cap portions 200 are disposed on one support portion 100, i.e., multiple cap portions 200 are disposed along the length of a support portion 100. Once each cap portion 200 is positioned upon a support portion 100, one or more step pad receiving openings 202, with further reference to FIG. 1, are formed. A step pad 300 is then positioned within such a step pad receiving opening 202.

In further explanation, each cap portion 200, in accordance with one embodiment of the invention, includes a cap portion body 204. The cap portion body 204 includes a first side 206 and a second side 208. In accordance with one embodiment of the invention, the first side 206 is a mirror image of the second side 208. Two cap portion supporting shoulders are respectively connected to the first side 206 and second side 208. More specifically, a cap portion supporting shoulder 210 is connected to the first side 206. Further, a cap portion supporting shoulder 212 is connected to the second side 208. In accordance with one embodiment, the cross-section shown in FIG. 3 is uniform throughout the length of a particular cap portion 200.

As shown in FIG. 3, a cap portion tab 214 extends downwardly from the cap portion supporting shoulder 210. The cap portion tab 214 includes a cap portion tab wall 216 and a cap portion locking protrusion 218. In a similar manner, a cap portion tab 220 extends downwardly from the cap portion supporting shoulder 212. The cap portion tab 220 includes a cap portion tab wall 222 and cap portion locking protrusion 224.

Illustratively, the cap portion 200 may be positioned upon a support portion 100 utilizing at least two techniques. For example, a cap portion may be "snapped" onto the support portion 100. Utilizing this technique, the cap portion 200 is positioned above the support portion 100, i.e., with each cap portion tab (214, 220), adjacent to corresponding shoulder portion (108, 110). Downward pressure is then exerted upon the cap portion 200. Construction of each cap portion tab wall (216, 222) allows for limited flexing such that each cap portion locking protrusion (218, 224) may pass by corresponding retaining shoulders (144, 148) of the support portion 100. Once each cap portion locking protrusion (218, 224) passes by the respective retaining shoulder (144, 148), the cap portion locking protrusions (218, 224) then snap into place. Specifically, each cap portion locking protrusion (218, 224) snaps into place so as to be disposed in respective retaining grooves (146, 150) of the support portion 100.

Alternatively, a cap portion 200 may be positioned upon a support portion 100 utilizing a sliding technique. That is, a cap portion 200 may be disposed at one end of the support portion 100. As should be appreciated, due to the arrangement of the cap portion supporting shoulders (210, 212) and the cap portion tabs (214, 220), i.e., due to the uniform cross-section, the cap portion 200 may be slidably received within the channel 152, as shown in FIG. 2.

Other suitable techniques may be employed to position and secure the cap portion 200 upon a support portion 100. For example, the cap portion may be spot-welded to the support portion, or it may be attached to the support portion by a series of fasteners, such as screws or bolts. Alternatively, any other type of suitable fastener may be used to attach the cap portion to the support portion, such as self tapping screws or a suitable adhesive. Further, the attachment device may utilize known techniques, such as countersinking, for example. Also, a material may be disposed between the support portion and the cap portion to both serve to secure the two elements together, as well as to eliminate rattles, for example. Illustratively, a bead of silicon may be used between the support portion and the cap portion.

As shown in FIG. 3, the cap portion 200 includes a cap portion body 204, as is described above. The cap portion body 204 includes an outer cap portion surface 230 and an inner cap portion surface 232. In accordance with one embodiment of the invention, reinforcement ribs 234 may extend from the inner cap portion surface 232 of the cap portion body 204. Illustratively, the reinforcement ribs 234 may contact with the upper surface 154 of the channel 152, as shown in FIG. 1. Accordingly, the reinforcement ribs 234 may provide additional strength to the cap portion 200.

As shown in FIG. 3, two reinforcement ribs 234 are shown. However, it should of course be appreciated that any number of reinforcement ribs 234 may be utilized as is desired. Further, any of a wide variety of shapes may be utilized for the reinforcement ribs 234. Each reinforcement rib 234 may be the same or different shape as compared to another reinforcement rib 234. Further, it is not necessary that the reinforcement rib 234 contact the upper surface 154 of the support portion 100.

As shown in FIG. 3, the cap portion body 204 is in the form of a semi-circle. However, other shapes may be utilized as is desired. The cap portion body 204 should be constructed so as to mate with a step pad 300, which is disposed in a step pad receiving opening 202 that is defined by two cap portions 200 disposed on a support portion 100.

Figure 4:
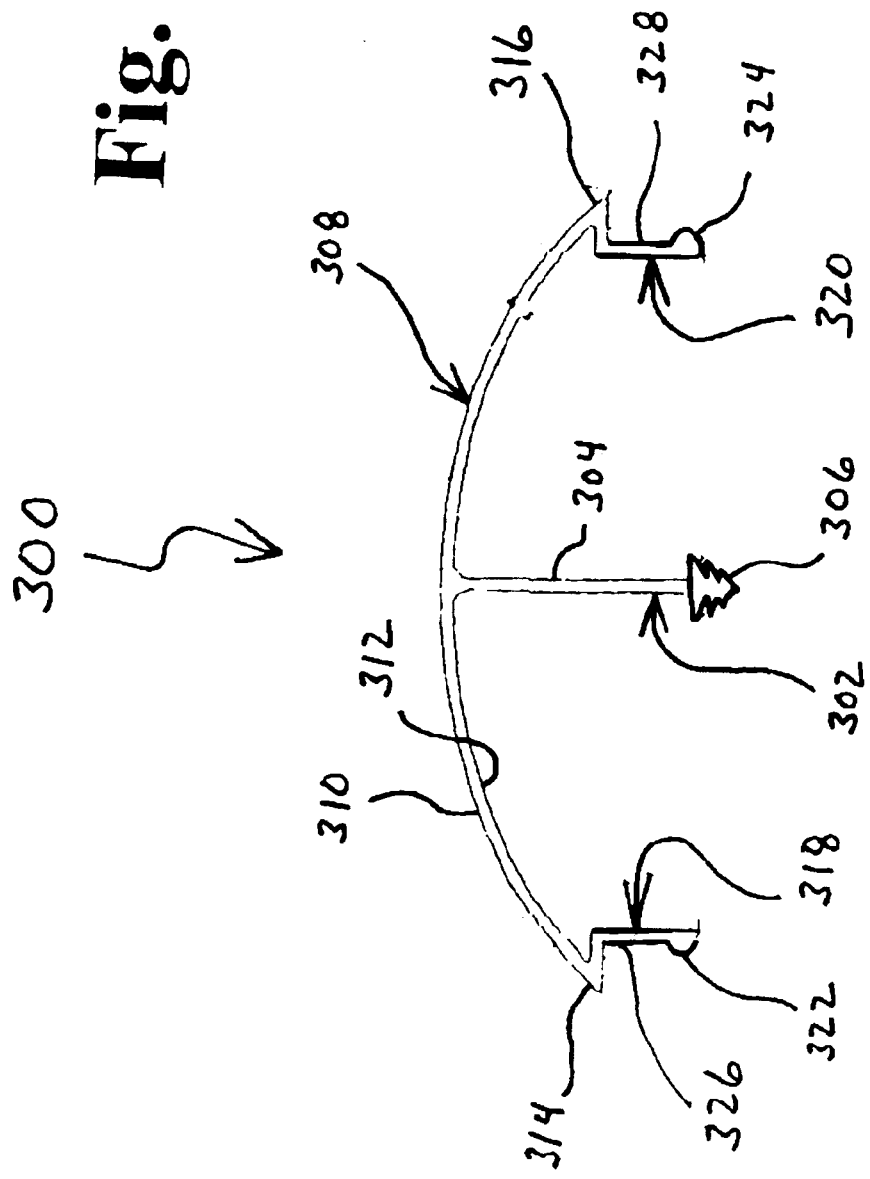
FIG. 4 is a cross-sectional view of the step pad taken along line 4—4 of FIG. 1 in accordance with one embodiment of the invention.

FIG. 4 is a diagram showing a step pad 300. The step pad 300 includes a step pad member 308. The step pad member 308 includes an outer surface 310 and an inner surface 312. As is described above, a fastener portion 302 extends from the inner surface 312 of the step pad member 308. The fastener portion 302 includes a fastener rod 304 and fastener end 306. The fastener end 306 may be attached to the keeper portion 116 in the connecting wall 112 of the support portion 100. The step pad 300 also includes step pad supporting shoulders (314, 316). The step pad supporting shoulders (314, 316) are positioned at opposing sides of the step member 308. Further, respective step pad tabs (318, 320) are connected to each step pad supporting shoulder (314, 316).

The step pad tab 318 includes a step pad locking protrusion 322 and a step pad tab wall 326. In a similar manner, the step pad tab 320 includes a step pad locking protrusion 324 and step pad tab wall 328.

In a manner similar to connecting the cap portion 200 to the support portion 100, the step pad 300 may be connected to the support portion 100 using different techniques. For example, a step pad 300 may be "snapped" onto the support portion 100. Utilizing this technique, the step pad 300 is positioned above the support portion 100, i.e., with each step tab (318, 320) adjacent to corresponding shoulder portion (108, 110). Downward pressure is then exerted upon the step pad 300. Construction of each step pad tab wall (326, 328) allows for limited flexing such that each step pad locking protrusion (322, 324) may pass by corresponding retaining shoulders (144, 148) of the support portion 100. Once each step pad locking protrusion (322, 324) passes by the respective retaining shoulder (144, 148) the step pad locking protrusions (322, 324) then snap into place. Specifically, each step pad locking protrusion (322, 324) snaps into place so as to be disposed in respective retaining grooves (146, 150) of the support portion 100.

Alternatively, a step pad 300 may be positioned upon a support portion 100 utilizing a sliding technique. That is, a step pad 300 may be disposed at one end of the support portion 100. As should be appreciated, due to the arrangement of the step pad supporting shoulders (314, 316) and the step pad tabs (318, 320), i.e., due to the uniform cross-section, the step pad 300 may be slidably received within the channel 152.

Other techniques may be used to connect the step pad 300 to the support portion 100. For example, spot welding or fasteners, such as screws or bolts, may be used to connect the step pad 300 to the support portion 100. Also, other techniques may be used such as an adhesive or even a frictional fit.

In accordance with one embodiment of the invention, a plurality of cap portions 200 and step pads 300 may be slid onto a support portion 100 in alternating sequence and spaced as desired so as to accommodate the dimensions of a particular vehicle. That is, a cap portion 200 may first be slid onto the support portion 100, after which a step pad 300 is slid onto the support portion 100, then followed by sliding a further cap portion 200 onto the support portion 100. The number of cap portions 200 and step pads 300 that are disposed on the support portion 100 may widely vary depending on personal preference or the vehicle, for example. Also, the particular length of the support portion 100, the cap portions 200, and/or the step pads 300, as well as the other dimensions, may vary as is desired. In one embodiment, there may be one cap portion and two step pads placed on the support portion 100, for example.

FIG. 5 is a diagram showing a side view of a mounting bracket 400 in accordance with one embodiment of the invention. As shown in FIG. 5, the mounting bracket 400 includes an attachment portion 411 and a supporting portion 415.

The attachment portion 411 of the mounting bracket 400 is constructed to be attached to a vehicle as is desired. Accordingly, the particular shape and attachment techniques utilized to attach the attachment portion 411 may vary. In accordance with one embodiment as shown in FIG. 5, the attachment portion 411 includes a bracket outer mounting surface 407 and a bracket inner mounting surface 408. Either of the bracket outer mounting surface 407 or the bracket inner mounting surface 408 may be positioned adjacent to a portion of a vehicle. For example, the attachment portion 411 might be attached onto the frame of a vehicle.

In order to assist in attachment of the attachment portion 411, the attachment portion 411 is provided with a bracket upper aperture 410 and a bracket lower aperture 412. Suitable connection devices may be utilized in conjunction with the bracket upper aperture 410 and the bracket lower aperture 412 in order to connect the mounting bracket 400 to a vehicle, i.e., such as bolts.

As described above, the mounting bracket 400 includes a supporting portion 415. The attachment portion 411 may be integrally connected with the supporting portion 415 through a mounting bracket member 414.

As is described above, the supporting portion 415 provides for attachment of the mounting bracket 400 to the support portion 100. Accordingly, the supporting portion 415 may be provided with a bracket supporting surface 422. The bracket supporting surface 422 may be provided with a curvature that corresponds to an exterior surface of the support 100. Each of the attachment shoulder 402 and the stabilizer rib 406 may be disposed upon the bracket supporting surface 422.

The mounting bracket 400 may be constructed using any of a wide variety of materials. Further, various techniques may be utilized to construct the mounting bracket 400. Illustratively, a molding or an extrusion technique may be utilized to construct the mounting bracket 400. Alternatively, the mounting bracket 400 may be formed by bending to a desired shape a metal member, such as a steel member.

It should be appreciated that an end cap may be disposed at each end of the running board of the invention, i.e., at ends of the support portion 100. The end caps may be constructed of suitable material such as plastic or metal, for example.

In accordance with some embodiments of the invention, the running board of the invention may be constructed of aluminum. However, it should be appreciated that the construction of the running board of the invention is not limited to aluminum. Rather, other suitable materials may be used as is desired.

Further, it should be appreciated that the running board 1100 of the invention may be constructed using a variety of techniques, as may be desired. For example, the support portion 100 and the cap portion 200 may each be respectively constructed by using an extrusion process. Further, the step pad 300 might be constructed using a suitable molding process, for example.

FIG. 6 is a diagram showing features of a running board arrangement 600. The running board arrangement 600 includes a support portion 610 attached to a mounting bracket 630 in accordance with a further embodiment of the invention. A step pad 620 is mounted on the support portion 610. The support portion 610 includes a slot 612 and a flange 614 as shown. A T-shaped bolt 640 with nut 642 may be used to secure the support portion 610 to the bracket 630. More specifically, the flange 614 may be pinched by the T-shaped bolt 640 so as to secure the support portion 610 on the bracket 630. The T-shaped bolt may possess a head 644 that extends along the slot 612. Accordingly, the T-shaped bolt is non-rotatable in the slot 612. The support portion 610 may also include an additional slot 616. The slot 616 may provide additional stability to the support portion 610, in accordance with one embodiment of the invention.

Figure 7:
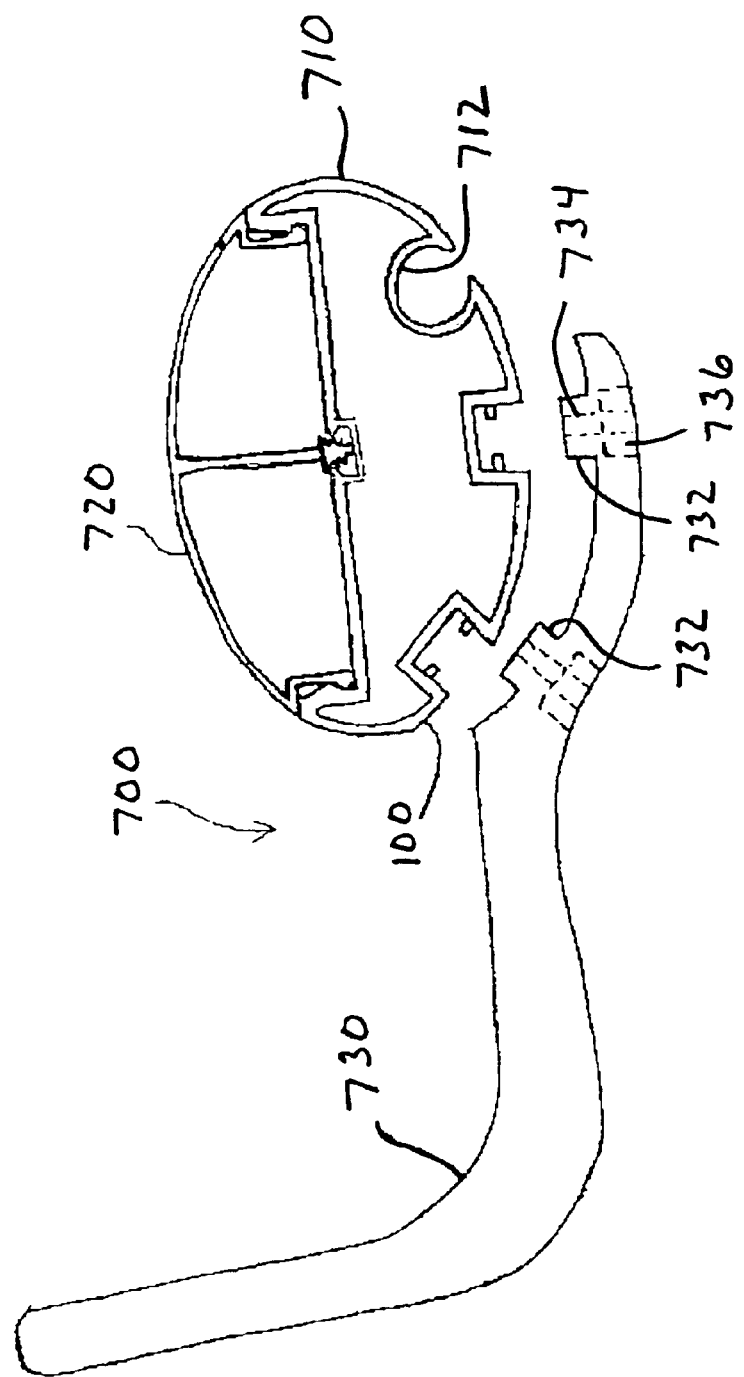
FIG. 7 is an end elevation view showing features of a structure of a running board attached to a mounting bracket, as well as features of a step pad, in accordance with one embodiment of the invention.

FIG. 7 is a diagram showing features of a running board arrangement 700, in accordance with one embodiment of the invention. The running board arrangement includes a support portion 710, a step pad 720 and a mounting bracket 730. As shown in FIG. 7, the mounting bracket 730 may include shoulder portions 732. Each shoulder portion 732 is provided with an aperture 734 through which a suitable bolt, such as the T-shaped bolt described above, may be disposed, i.e., so as to secure the bracket 730 with the support portion 710. Further, a counter sink 736 may be provided on the bracket 730, as may be desired.

In accordance with the embodiment shown in FIG. 7, the support portion 710 may further include a receptacle 712. The receptacle 712 runs along a length of the support portion 710. A light assembly may be disposed in the receptacle 712 in accordance with one embodiment of the invention. Such a light assembly may be desirable for aesthetic reasons, as well as for safety reasons.

Figure 8:
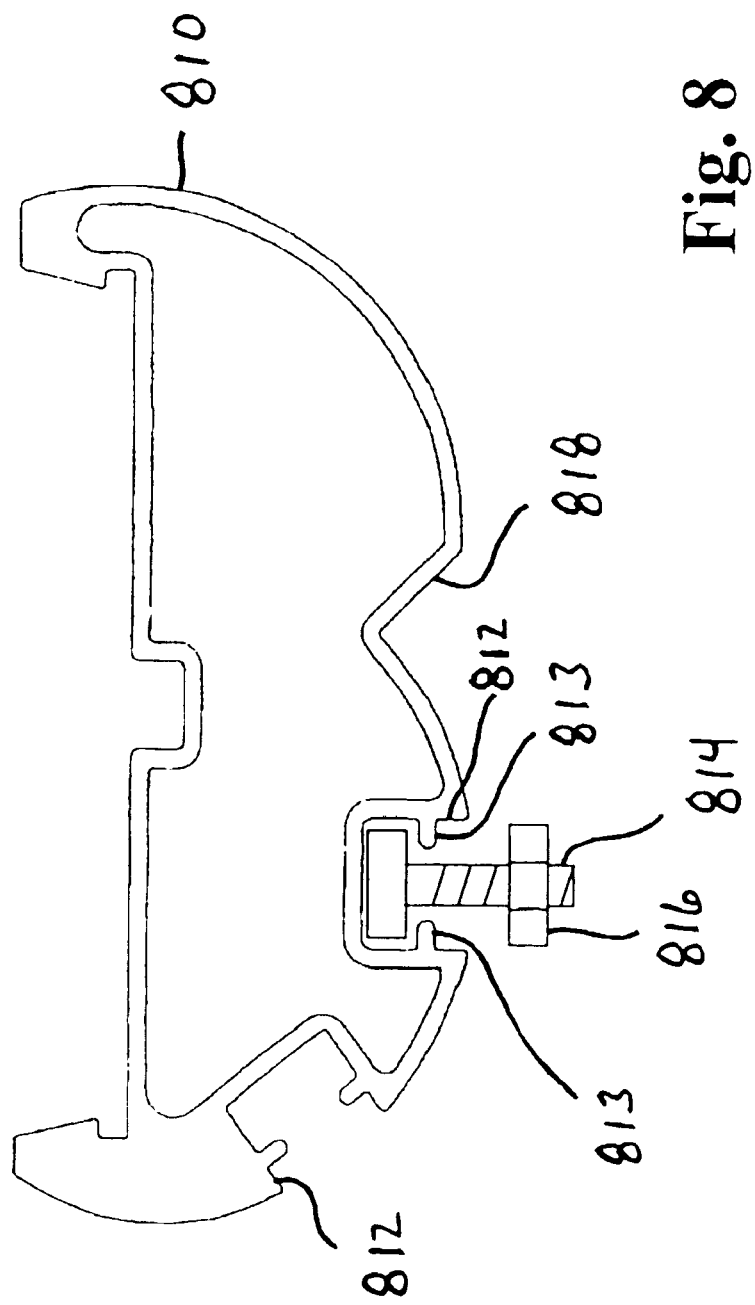
FIG. 8 is an end elevation view showing features of a support portion in accordance with one embodiment of the invention.

FIG. 8 is an end elevation view showing features of a support portion 810 in accordance with a further embodiment of the invention. As shown in FIG. 8, the support portion 810 includes a plurality of slots 812 that provide for the attachment of the support portion onto a suitable bracket. As shown in FIG. 8, the slots 812 may each include a flange 813. Further, a T-shaped bolt 814 and nut 816, as described above, may be used in conjunction with the slot 812 so as to mount the support portion 810.

The support portion 810 of FIG. 8 further includes a recess 818. A portion of a suitable bracket may be disposed in the recess 818. Such an arrangement may be aesthetically desirable. Further, such an arrangement may be desirable to provide a flush continuity between the support portion and a bracket, i.e., so as to prevent items from being caught between the bracket and the support portion during off-road travel, for example. It should be appreciated that the recess 818 may be any shape desired. However, the shape of the recess 818 may preferably correspond to the shape of a utilized mounting bracket.

Figure 9:
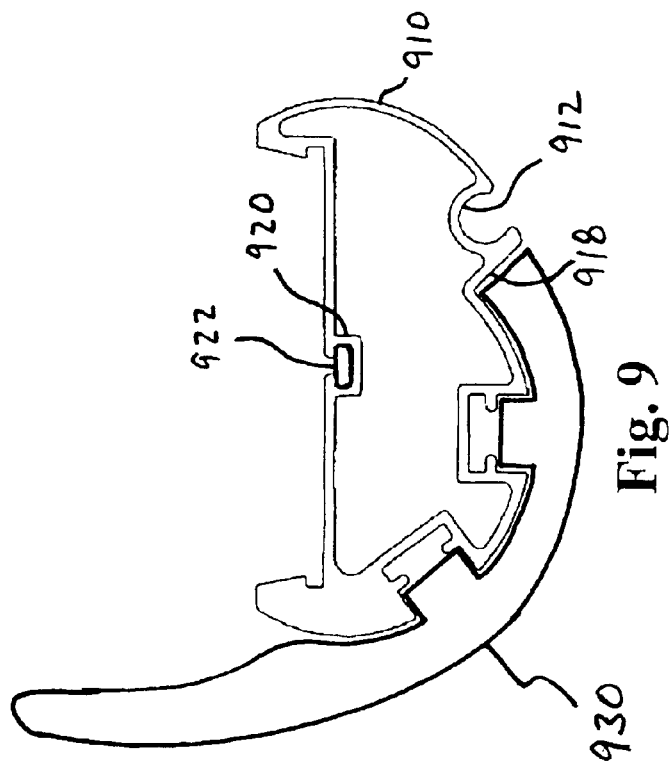
FIG. 9 is an end elevation view showing features of a support portion in accordance with another embodiment of the invention.

FIG. 9 is an end elevation view showing features of a support portion 910 in accordance with another embodiment of the invention. The support portion 910 includes a recess 918 that accepts a bracket 930, as described above in conjunction with FIG. 8. Further, the support portion 910 includes a receptacle 912, in a manner similar to the support portion shown in FIG. 7. The receptacle 912 runs along a length of the support portion 910 and may be used to retain a light assembly.

Further, the support portion 910 as shown in FIG. 9 also includes a light slot 920. A light assembly 922 may be disposed in the light slot 920. For example, the light assembly may be a fiber optic cable or light tube that provides illumination along its length. However, any suitable light assembly may be used.

Figure 10:
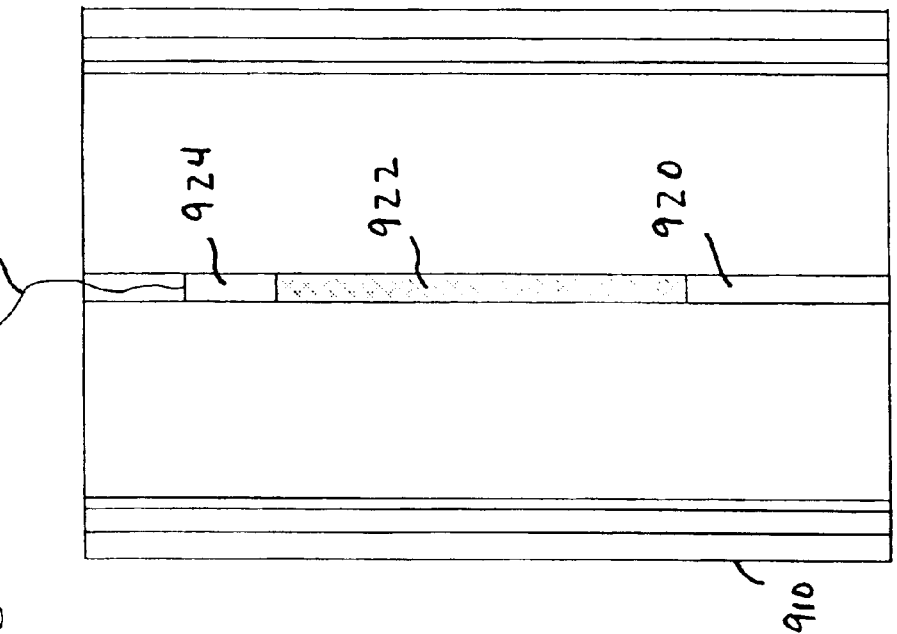
FIG. 10 is a top plan view of the support portion shown in FIG. 9 in accordance with one embodiment of the invention.

FIG. 10 is a top view of the support portion 910 shown in FIG. 9. As shown in FIG. 10, the light assembly 922 extends along the length of the light slot 920. Further, as shown in FIG. 10, a suitable power pack 924 may be utilized in conjunction with the light assembly 922. In accordance with one embodiment of the invention, the power pack 924 may be connected to a vehicle's electrical system by a wire 926. That is, the power pack 924 may receive an input from a vehicle's electrical system indicating that the vehicle's interior lights are on or that a door is ajar, for example. In response, the power pack 924 provides current to illuminate the light assembly 922.

FIG. 11 is a top plan view of a step pad 960 in accordance with one embodiment of the invention. The step pad 960 may be mounted on the support portion 910 as shown in FIGS. 9 and 10. As shown in FIG. 11, the step pad 960 is provided with a plurality of openings or slots 964. When used in conjunction with the support portion 910 and light assembly of FIGS. 9 and 10, the openings 964 allow the passage of light through the step pad. As a result, the light provides an aesthetically pleasing step pad and illuminates a proper stepping area for a person entering a vehicle, for example.

The step pad 960 of FIG. 11 further includes a name plate 962. The name plate 962 may be constructed of an opaque material. Alternatively, the name plate 962 may be constructed of any suitable material such as transparent material. Such construction using a transparent material may be desired since light, from a light assembly 922 for example, may highlight the name in an aesthetically pleasing manner.

Figure 13:
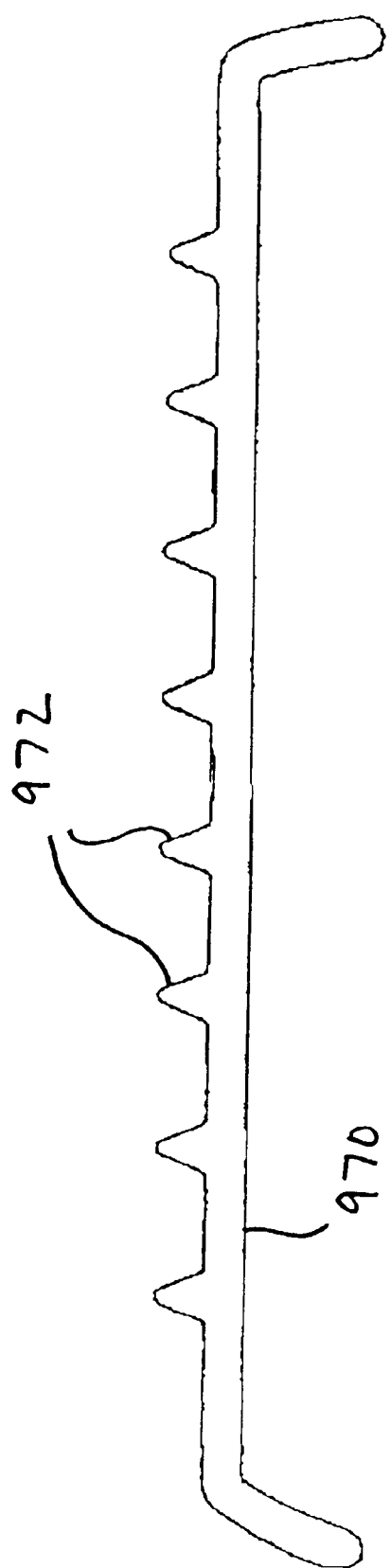
FIG. 13 is an end elevation view showing a cap portion in accordance with one embodiment of the invention.

FIG. 12 is a side elevation view showing the step pad of FIG. 11 in accordance with one embodiment of the invention. As shown in FIG. 12, end portions 966 of the step pad 960 may be angled so as to mate with opposing cap portions. Further, the step pad 960 may be provided with a raised flange 968 on each side, as is shown in FIG. 12 and as shown in FIG. 11 in phantom. The raised flanges 968 may be preferable to secure the step pad 960 upon a support portion FIG. 13 is an end elevation view showing a step pad 970 in accordance with a further embodiment of the invention. As shown in FIG. 13, the step pad 970 is provided with a plurality of traction ridges 972. The traction ridges 972 run along the length of the step pad 970 and reduce slippage upon the step pad 970. It should further be appreciated that distinct traction ridges 972 may be spaced apart along the length of the step pad 970 or step pad 960, i.e., so as to prevent slippage along the length of the step pad 970. Further, the traction ridges 972 may be broken in any desired manner so as to be used in conjunction with the name plate 962 and/or the slots 964 discussed above.

Figure 14:
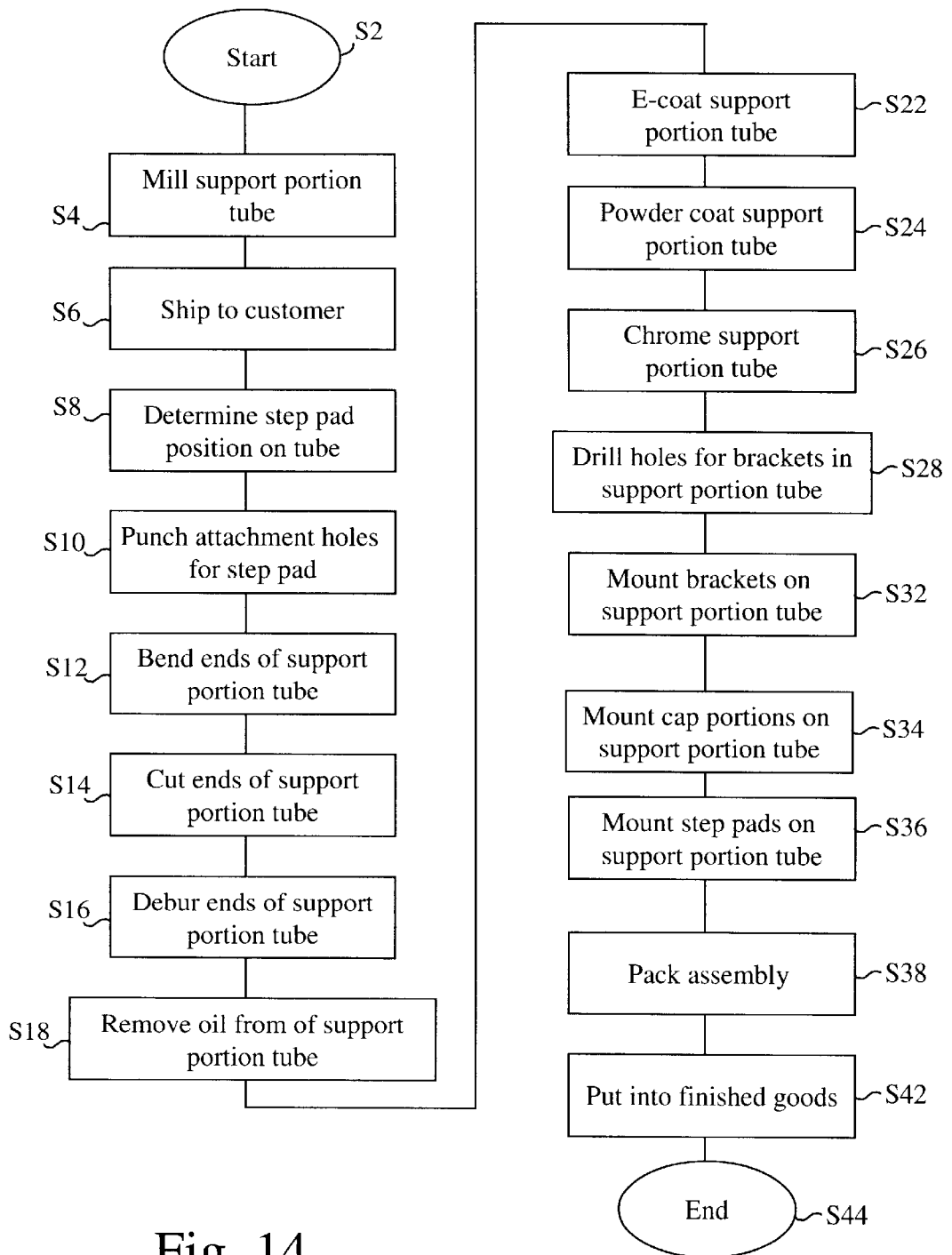
FIG. 14 is a flowchart showing a process in accordance with one embodiment of the invention.

FIG. 14 is a flowchart showing the process of making a running board in accordance with one embodiment of the invention. As shown in FIG. 14, the process starts in step S2 and passes to step S4. In step S4, the support portion tube, i.e., the support portion tube 100 as shown in FIG. 1, for example, is milled or otherwise formed using a suitable process. An extrusion process might be utilized. Then, in step S6, the support portion tube, as well as cap portions and step pads, are shipped to a customer. For example, the customer might be an individual who is in the business of installing running boards on vehicles. After step S6, the process passes to step S8.

In step S8, the desired position of the step pad on the support portion tube is determined. Then in step S10, attachment holes are punched for the step pad, i.e., to attach a fastener portion 302 as shown in FIG. 4, for example. Then, in step S 12, the support portion tube is bent as desired. For example, the ends of the support portion tube may be bent at a right angle, for example, as is typical with running boards. Then, the ends of the support portion tube are cut and deburred in steps S14 and S16. After step S16, the process passes to step S18.

In step S18, oil is removed from the support portion tube if necessary, i.e., a cleaning process is effected upon the support portion tube. Then, in steps S22–S26, the support portion tube may be suitably coated. This coating might also be performed upon the cap portions and/or the step pad portions. Specifically, an e-coating, powder coating, chrome coating, or any other suitable coating may be applied, as is desired.

Then, in step S28, holes are drilled in the support portion tube for mounting of the support brackets. Then, in step S32, the support brackets are mounted on the support portion tube. Then, the process passes to step S34.

In step S34, the cap portions are mounted on the support portion tube in a spaced apart manner. Note that the support portion tube may be bent, as described above. If the support portion tube is bent, the cap portions might be mounted upon the support portion tube prior to bending, i.e., so as to be bent with the support portion tube, or alternatively, the cap portions might be separately bent in the same manner and then "snapped" onto the support portion tube. In conjunction with step S34, end caps may be mounted on the ends of the support portion tube.

After step S34, the process passes to step S36. In step S36, the step pads are mounted or snapped on the support portion tube, i.e., in respective openings formed by the spaced cap portions. Then, the running board assembly in accordance with one embodiment of the invention is completed.

Accordingly, after step S36, the process passes to step S38. In step S38, the completed running board may be packed and shipped as desired. Alternatively, or in addition to, in step S42, the completed running board assembly is then put into finished goods, i.e., the running board is mounted upon a vehicle, for example. In step S44, the process ends. Accordingly, the illustrative process of FIG. 14 allows a customer to receive a support portion tube and form the support portion tube as desired, snap in the cap portions and step pads, mount end caps if desired, and mount support brackets—thus resulting in a completed running board assembly. The components might be constructed of aluminum or another suitable material. Further, the components may be constructed of the same or different materials.

It should be appreciated that the running board of the invention may be made using the process of FIG. 14, or any other suitable process. Further, the order of the steps of the process of FIG. 14 may of course be varied, as desired. Accordingly, the invention provides various advantages over known processes for making running boards, such as enhanced design flexibility It should be appreciated that the invention is described herein in conjunction with various illustrative sizes, i.e., dimensions, or proportions of relative components. However, it will be appreciated that such dimensions or proportions are for purposes of illustration and that any suitable dimensions or proportions might be utilized in the practice of the invention. Such dimensions or proportions might vary depending on the type of vehicle, as well as the personal tastes of the owner of the vehicle, for example.

It will be readily understood by those persons skilled in the art that the invention is susceptible to broad utility and application. Many embodiments and adaptations of the invention other than those herein described, as well as many variations, modifications and equivalent arrangements, will be apparent from or reasonably suggested by the present invention and foregoing description thereof, without departing from the substance or scope of the invention.

Accordingly, while the invention has been described here in detail in relation to its exemplary embodiments, it is to be understood that this disclosure is only illustrative and exemplary of the present invention. Accordingly, the foregoing disclosure is not intended to be construed as limiting the invention or otherwise to exclude any other such embodiments, adaptations, variations, modifications and equivalent arrangements.

What is claimed is:

1. A running board assembly for attachment to a vehicle, the running board assembly comprising:
    an elongated support portion, the support portion including a support wall portion having an inward wall portion and an outward wall portion, the support portion further including an outward shoulder portion and an inward shoulder portion, the outward shoulder portion disposed on the outward wall portion, the inward shoulder portion disposed on the inward wall portion;
    at least two cap portions, each of the at least two cap portions connected to extend between the outward shoulder portion and the inward shoulder portion of the support portion, the at least two cap portions spaced from each other along a channel within the support portion, the spaced apart cap portions defining an opening between the cap portions for a step pad; and
    a step pad connected to the outward shoulder portion and the inward shoulder portion of the support portion, the step pad disposed in the opening.

2. The running board assembly of claim 1, wherein the support portion further includes a connecting wall, the connecting wall connecting the outward shoulder portion and the inward shoulder portion, wherein the connecting wall, the inward wall portion and the outward wall portion define an annular member.

3. The running board assembly of claim 1, wherein the support portion further includes a lower slot portion disposed between the inward wall portion and the outward wall portion, the lower slot portion engageable with a mounting bracket.

4. The running board assembly of claim 1, wherein each cap portion includes:
    a cap portion body having a first side and a second side that opposes the first side;
    two cap portion supporting shoulders respectively connected to the first side of the cap portion body and to the second side of the cap portion body; and
    two cap portion tabs respectively connected to each of the cap portion supporting shoulders, wherein the cap portion tabs are engageable with the corresponding inward shoulder portion and outward shoulder portion.

5. The running board assembly of claim 2, wherein the connecting wall includes a keeper portion, the step pad further includes a fastener portion, which is engageable with the keeper portion to secure the step pad onto the support portion in the opening.

6. The running board assembly of claim 3, wherein the inward wall portion further includes a side slot, which is engageable with a mounting bracket.

7. The running board assembly of claim 4, wherein each cap portion tab includes a cap portion tab wall that extends from the cap portion body, and a cap portion locking protrusion disposed at the end of the cap portion tab wall.

8. The running board assembly of claim 4, wherein the cap portion body includes an outer cap portion surface and an inner cap portion surface, the cap portion further including at least one reinforcement rib, the reinforcement rib extending from the inner cap portion surface.

9. The running board assembly of claim 5, wherein the keeper portion includes a keeper slot, the fastener portion includes a fastener end which is engageable with the keeper slot.

10. The running board assembly of claim 6, wherein the lower slot portion and the side slot extend along a length of the elongated support portion.

11. The running board assembly of claim 6, further including a mounting bracket having a supporting portion and an attachment portion connected to the supporting portion, the supporting portion engaged with the lower slot portion and the side slot, and the attachment portion for attaching to a vehicle.

12. The running board assembly of claim 7, wherein each of the outward shoulder portion of the support portion and the inward shoulder portion of the support portion includes a retaining shoulder and a retaining groove, wherein the retaining shoulder is interfaceable with the cap portion tab wall and the retaining groove is engageable with the cap portion locking protrusion.

13. The running board assembly of claim 8, wherein the cap portion body is semi-circular.

14. The running board assembly of claim 11, wherein the supporting portion includes a stabilizer rib and an attachment shoulder, the stabilizer rib engaged with the side slot of the support portion, the attachment shoulder engaged with the lower slot portion of the support portion.

15. The running board assembly of claim 11, wherein the supporting portion includes an attachment shoulder having at least one shoulder retaining surface, and the lower slot portion including at least one flange having at least one flange retaining surface, wherein the at least one shoulder retaining surface is engageable with the at least one flange retaining surface, such that the attachment shoulder is slidably receivable and securable in the lower slot portion.

16. The running board assembly of claim 15, wherein the attachment shoulder is slidably received in the lower slot portion of the support portion along a length of the support portion.

17. The running board assembly of claim 15, further including a securing device extending through the at least one flange and engageable with the at least one shoulder retaining surface, such that the securing device secures the attachment shoulder within the lower slot portion after the attachment shoulder is slidably received in the lower slot portion.

18. The running board assembly of claim 17, wherein the securing device is a securing screw.

19. A method for making a running board assembly for attachment to a vehicle, the method comprising the steps of:
    forming an elongated support portion, the support portion including a support wall portion having an inward wall portion and an outward wall portion, the support portion further including an outward shoulder portion and an inward shoulder portion, the outward shoulder portion disposed on the outward wall portion, the inward shoulder portion disposed on the inward wall portion;

forming at least two cap portions;

connecting each of the at least two cap portions to extend between each of the outward shoulder portion and the inward shoulder portion of the support portion, the at least two cap portions spaced from each other along a channel within the support portion, the spaced apart cap portions defining an opening between the cap portion for a step pad;

forming a step pad; and connecting the step pad to each of the outward shoulder portion and the inward shoulder portion of the support portion, the step pad disposed in the opening.

20. The method of claim 19, wherein the step of connecting each of the at least two cap portions upon each of the outward shoulder portion and the inward shoulder portion of the support portion includes sliding each cap portion onto the support portion.

21. The method of claim 19, wherein the step of connecting each of the at least two cap portions upon each of the outward shoulder portion and the inward shoulder portion of the support portion includes snapping each cap portion onto the support portion.

22. The method of claim 19, wherein the step of connecting the step pad to each of the outward shoulder portion and the inward shoulder portion of the support portion includes sliding each step pad onto the support portion.

23. The method of claim 19, wherein the step of connecting the step pad to each of the outward shoulder portion and the inward shoulder portion of the support portion includes snapping each step pad onto the support portion.

24. The method of claim 19, wherein forming an elongated support portion includes forming the elongated support portion using an extrusion process.

25. The method of claim 19, wherein the support portion includes a light assembly.

26. The method of claim 19, wherein the step pad includes a plurality of traction ridges.

27. The method of claim 25, wherein the step pad includes a plurality of openings such that light emitted from the light assembly may pass through the plurality of openings in the step pad.

28. The method of claim 27, wherein the light assembly is disposed in a slot in the support portion.

29. A running board assembly for attachment to a vehicle, the running board assembly comprising:

an elongated support portion, the support portion including a support wall portion having an inward wall portion and an outward wall portion, the support portion further including an outward shoulder portion and an inward shoulder portion, the outward shoulder portion disposed on the outward wall portion, the inward shoulder portion disposed on the inward wall portion;

at least two cap portions, each of the at least two cap portions connected to extend between the outward shoulder portion and the inward shoulder portion of the support portion, the at least two cap portions spaced from each other along a channel within the support portion, the spaced apart cap portions defining an opening between the cap portions for a step pad;

a step pad connected to the outward shoulder portion and the inward shoulder portion of the support portion, the step pad disposed in the opening; and a mounting bracket having a supporting portion and an attachment portion connected to the supporting portion, the supporting portion of the mounting bracket engaged with and supporting the support portion, and the attachment portion for attaching to a vehicle; and wherein the support portion further includes a connecting wall, the connecting wall connecting the outward shoulder portion and the inward shoulder portion, wherein the connecting wall, the inward wall portion and the outward wall portion define an annular member, the connecting wall includes a keeper portion, the step pad further includes a fastener portion, which is engageable with the keeper portion to secure the step pad onto the support portion in the opening; and wherein each cap portion includes:
a cap portion body having a first side and a second side that opposes the first side;
two cap portion supporting shoulders respectively connected to the first side of the cap portion body and to the second side of the cap portion body; and
two cap portion tabs respectively connected to each of the cap portion supporting shoulders, wherein the cap portion tabs are engageable with the corresponding inward shoulder portion and outward shoulder portion.

* * * * *